June 7, 1927.   1,631,183
R. I. ALEXANDER ET AL
STEERING MECHANISM FOR MOBILE MACHINERY
Original Filed Nov. 24, 1924   2 Sheets-Sheet 1
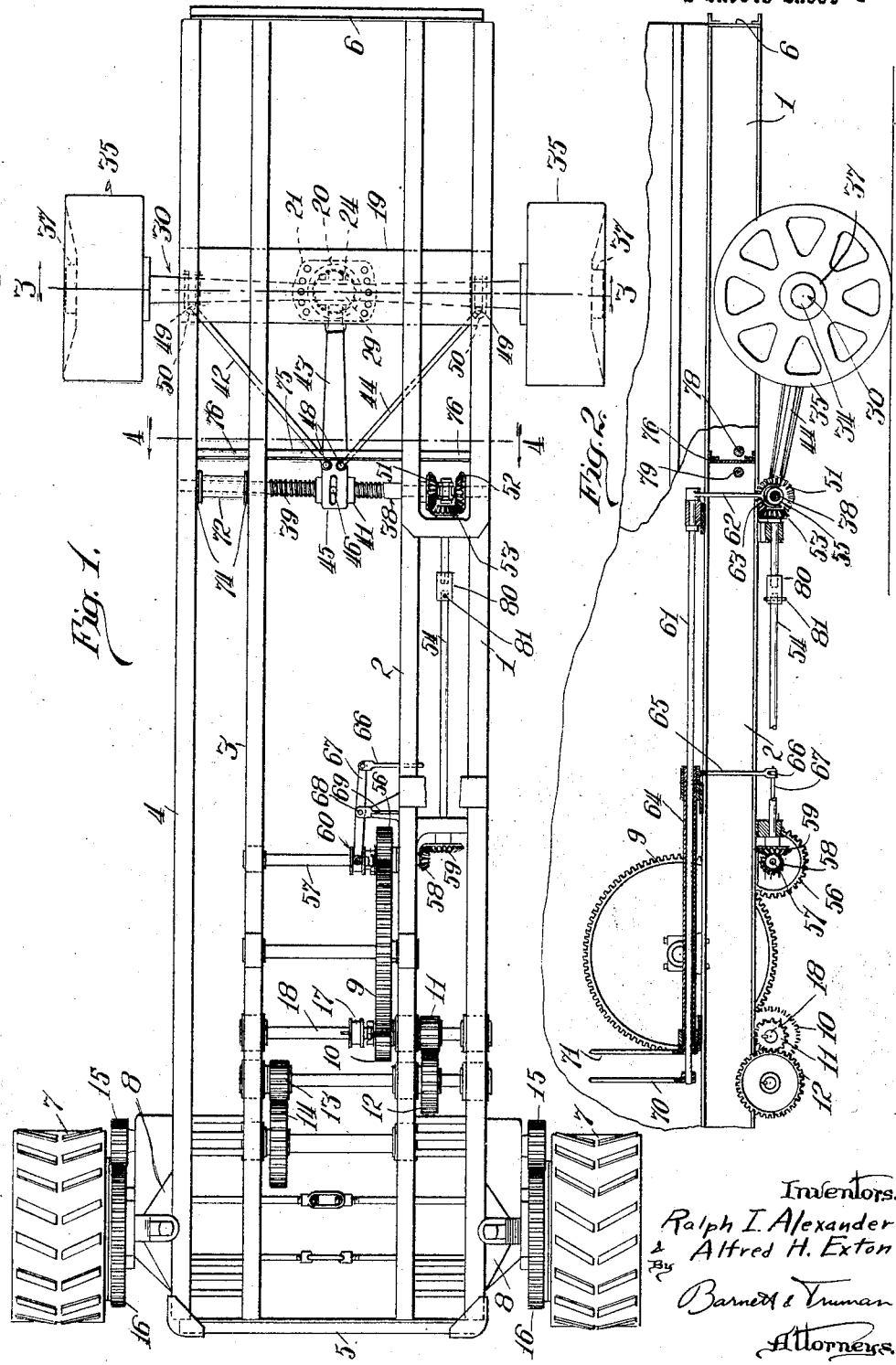
Inventors.
Ralph I. Alexander
& Alfred H. Exton
By
Barnett & Truman
Attorneys.

June 7, 1927.

R. I. ALEXANDER ET AL 1,631,183

STEERING MECHANISM FOR MOBILE MACHINERY

Original Filed Nov. 24, 1924      2 Sheets-Sheet 2

Inventors.
Ralph I. Alexander
& Alfred H. Exton
By Barnett & Truman
Attorneys.

Patented June 7, 1927.

1,631,183

UNITED STATES PATENT OFFICE.

RALPH IRWIN ALEXANDER, OF KANKAKEE, AND ALFRED H. EXTON, OF CHICAGO HEIGHTS, ILLINOIS, ASSIGNORS TO INLAND ENGINEERING COMPANY, OF CHICAGO, ILLINOIS, A CORPORATION OF ILLINOIS.

STEERING MECHANISM FOR MOBILE MACHINERY.

Original application filed November 24, 1924, Serial No. 752,017. Divided and this application filed July 27, 1925. Serial No. 46,458.

This invention relates to traction equipment for heavy mobile machinery, and more particularly to an improved supporting and transporting carriage for massive steam shovels or other excavating machinery. The present invention relates especially to that portion of the supporting mechanism for the carriage by means of which the carriage is steered. This application is a division of our copending application, Serial No. 752,017, filed November 24th, 1924.

Machines of this type usually comprise a pivoted boom, centrally mounted at the front end of the carriage for supporting and controlling the bucket or other lifting apparatus, and a lifting winch and a power plant (usually steam operated) upon the central and rear portions of the carriage. Such machines are usually mounted upon a modified railway carriage, it being necessary to lay track sections in front or behind the carriage whenever it is moved in either direction. Jack arms extend laterally outwardly and downwardly, from the front end of the carriage, and jack screws carried by these arms are screwed down into contact with the ground or other supporting surface when the machine is in operation, to steady the machine and to take a part or all of the weight of this end of the apparatus from the car trucks and track. Such machines have also been mounted on creeping traction driving means of the endless chain type, but such apparatus is complicated and expensive and the large supporting area is unnecessary when the machines are to be operated in stone quarries, or other places where the supporting terrain is fairly firm and substantial.

In the parent application, Serial No. 752,017, referred to hereinabove, we have disclosed a machine of this general type in which the carriage is mounted upon large, broad face supporting wheels, which project well beyond the sides of the carriage frame, and serve not only as supporting and transporting means, but also perform the functions of the screw jacks previously mentioned, to brace the machine at the sides, when in service. These wheels have sufficient supporting area to carry the tremendous weight of the machine above the rocky floor of a stone quarry, and will also transport the machine easily over extremely uneven surfaces. Somewhat similar, but smaller, wheels are so mounted at the rear of the carriage that the machine may be steered thereby. The present invention relates particularly to that portion of the carriage and its supporting means whereby the carriage is steered.

The principal object of this invention is to provide an improved steering assembly adapted for massive machinery of the type hereinabove described.

Another object is to provide a steering mechanism of this type which is power driven from the same power plant which is used to operate the lifting mechanism of the machine, and also to drive the front traction wheels when the machine is being transported.

Another object is to provide such a steering mechanism with means whereby it may be conveniently controlled by the operator from his position at the front of the carriage.

Another object is to provide improved means for pivotally mounting the carriage on the steering wheels, whereby the wheels may be swung horizontally to steer the carriage, and may also swing or rock in a vertical plane to facilitate passage over uneven ground.

Another object is to provide improved mechanism for swinging the wheels laterally to steer the carriage.

Another object is to provide improved means for strengthening and bracing the carriage frame, to withstand the side thrusts and twisting strains of the wheel mountings and the power driven steering apparatus.

Numerous other objects and advantages of the invention will be apparent from the following detailed description of one approved form of the apparatus.

In the accompanying drawings:

Fig. 1 is a plan view of the carriage, or chassis, with the super-structure removed.

Fig. 2 is a side elevation, partially broken away, of the central and rear portions of the carriage and supporting means.

Figure 3:
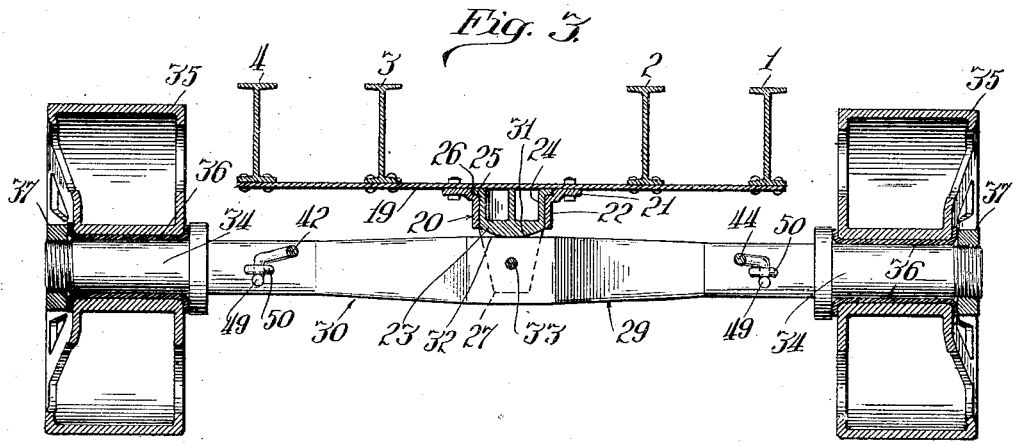
Fig. 3 is a transverse vertical section on a somewhat larger scale, taken substantially on the line 3—3 of Fig. 1.
Figure 4:
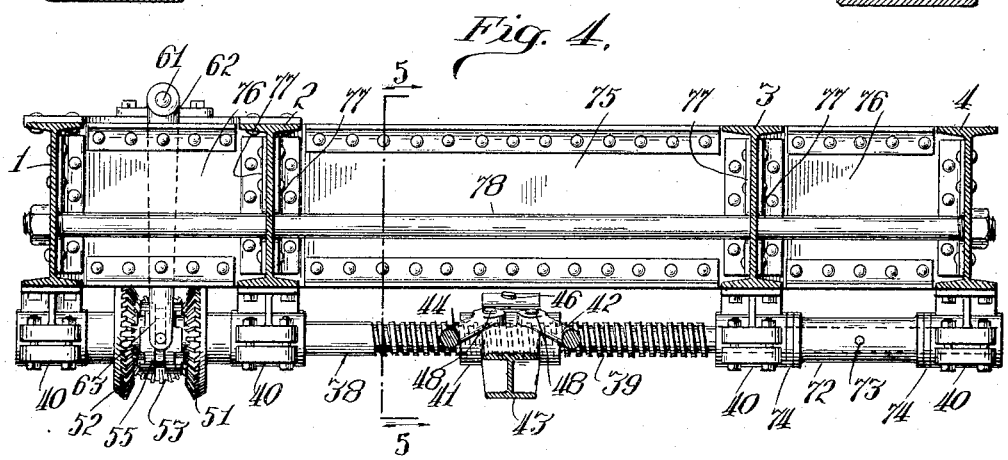
Fig. 4 is a transverse vertical section, on a still larger scale, taken substantially on the line 4—4 of Fig. 1.
Figure 5:
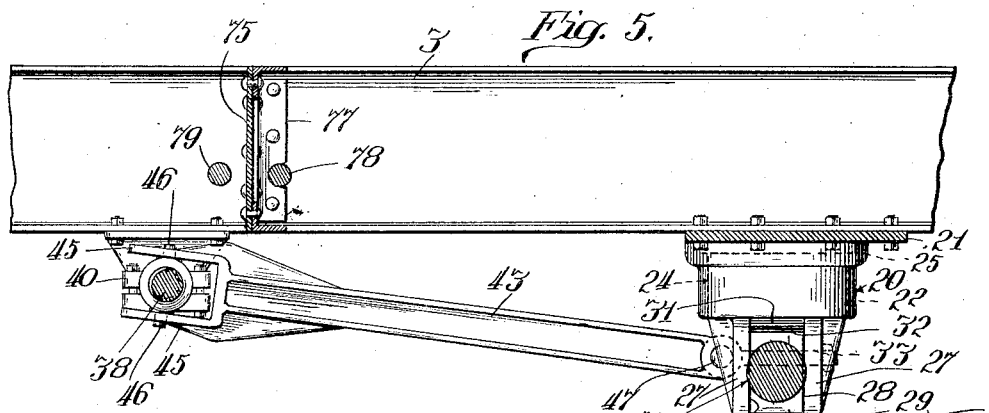
Fig. 5 is a longitudinal vertical section, taken substantially on the line 5—5 of Fig. 4.

The carriage frame comprises, preferably, a plurality of longitudinally extending I-beams, 1, 2, 3, and 4, which are connected at their front ends by a cross-beam 5, and at their rear ends by a cross-beam 6. There are other transverse bracing members between these beams, some of which will be referred to in detail hereinafter. When this carriage is used as the support for a steam shovel, the boom and other lifting mechanism will be mounted above the front end 5 of the carriage. The remainder of the carriage will carry the lifting winch, the power plant, and the fuel bins and other accessories. It should be understood at the outset that these machines are extremely massive and heavy, often weighing considerably more than a hundred tons, so that ordinary carriage constructions cannot be used, due to the impracticability of constructing the ordinary carriage parts of sufficient size and strength to carry the enormous load, and withstand the side thrusts and tilting strains.

The front end of the carriage, where the greater portion of the weight is concentrated is carried upon a pair of large, broad-faced metal traction wheels 7. These wheels, which have a very wide spread or tread not only perform the function of the jack-arms heretofore employed, but also serve as the driving traction means for moving the apparatus from place to place. These wheels 7 are mounted upon a pair of jack-arms 8 which extend outwardly and downwardly from the side carriage beams 1 and 4. Suitable means (not here shown in detail) are used for tying together the two jack-arms 8, and distributing the load from these arms between the several beams 1, 2, 3 and 4. At 9 is shown a large gear on the winding-drum driving mechanism, which will be driven from the power plant on the carriage in the usual manner. The traction wheels 7 are driven from gear 9 through a train of reduction gearing 10, 11, 12, 13, 14, 15 and 16. This train of driving gears may be thrown into or out of operation by means of the clutch 17 which connects gear 10 to its shaft 18. All of the above is substantially as set forth in greater detail, and claimed, in our copending application, Serial No. 752,017, referred to hereinabove.

The present invention relates more particularly to the mechanism for supporting, strengthening and guiding the rear or steering end of the carriage, and to the power driven connections for driving this steering mechanism. At the rear of the carriage, (or at an intermediate position if the load is concentrated near the forward end, as in a steam shovel), a broad flat supporting plate 19 is secured beneath the carriage beams 1, 2, 3 and 4. A swivel casting 20 is secured centrally beneath this plate 19. This casting comprises a horizontal flange 21, which is bolted to the plate 19, and a downwardly projecting hollow cylindrical portion 22. A swivel-head 23 is held within this casting 20, so that it may rotate about a central vertical axis. Head 23 comprises a main cylindrical portion 24 fitting closely within the sleeve 22 of casting 20, and an upper outwardly flared flange 25 which fits an annular groove or recess 26 between the upper portion of casting 20 and the plate 19. The lower end of head 23 is split or forked to provide a pair of spaced downwardly projecting arms 27, between which is a recess 28 for receiving the central rectangular portion 29 of the rear axle 30. The lower surface of head 23 between the arms 27 is curved, as at 31, to provide a supporting surface for the flat upper portion 32 of axle 30. A horizontal bolt or pivot pin 33 extends centrally through the arms 27 and portion 29 of axle 30, and serves to hold the axle centered against edgewise movement. The greater portion of the load, however, is transmitted from the carriage to the axle 30 through the contacting surfaces 31 and 32, and is not carried by the pivot bolt 33, which may have a loose fit in the arms 27 and axle 30. It will be noted that the axle and steering wheel assembly is permitted a limited rocking movement in a vertical plane about the axis of bolt 33, a certain amount of slippage taking place between the supporting surfaces 31 and 32 to permit this movement. The axle assembly pivots about the central vertical axis of castings 20 and 23 for steering the wheels, as hereinafter described.

Each end of the axle 30 is formed as a journal 34, on which is mounted one of the large broad spaced metal steering wheels 35, a bearing sleeve 36, of suitable bearing metal, being interposed between the journal 34 and the hub of wheel 35. The wheels 35 are held in place in any suitable manner, as by means of nuts 37. These steering wheels 35 may be placed closer together than the front traction wheels 7, so that the length of axle 30 need not be excessive, and the weight to be supported at the rear end of the carriage (which is not as great as at the front end) can be satisfactorily supported by such a centrally pivoted axle.

A cross shaft 38, the central portion of which is threaded, as at 39, is mounted in bearings 40, secured to the lower sides of frame beams 1, 2, 3 and 4. This transverse shaft 38 is mounted beneath an intermediate portion of the carriage frame, somewhat in advance of the rear axle 30, as shown in Figs. 1 and 2. A nut 41 is movable along the threaded portion 39 of shaft 38, this nut being connected with the axle 30 by means of rods or links 42, 43 and 44. The forward end of rod 43 is forked to provide a pair of parallel arms 45 which straddle the upper and lower sides of nut 41, there being bosses or projections 46 on this nut 41 which engage in slots or grooves in the arms 45. This connection compels the rod 43 to share the transverse movement of nut 41, and simultaneously permits the nut 41 to move longitudinally through the forked end of rod 43, since this rod moves in an arc, whereas the nut 41 travels in a straight line. The rear end of central rod 43 is pivotally connected at 47 with an eye on the front end of pivot pin 33. The side links 42 and 44 are secured at their front ends 48 to the enlarged forward end of central rod 43, and their rear ends are hooked, as at 49, to engage the eyes of U-bolts 50, secured in the rear axle 30.

A pair of oppositely facing beveled gears 51 and 52 are mounted loosely on shaft 38 between the bearings 40 suspended from beams 1 and 2. A beveled gear 53 on longitudinally extending drive shaft 54 meshes with the beveled gears 51 and 52 and drives them simultaneously in opposite directions.
By means of an intermediate clutch 55, keyed to shaft 38, either gear 51 or 52 may be clutched to this shaft to rotate the screw shaft in one direction or the other, as desired. In mechanisms of this type, heretofore in use, this power driven steering mechanism has been actuated by a separate driving unit, such as a motor or donkey engine. In the present improved construction, this steering mechanism is actuated from the same driving means which actuates the winch and the traction wheels, as previously described. The drive shaft 54 is driven from main driving gear 9 through the gear 56 loosely mounted on the intermediate shaft 57, and the beveled gears 58 and 59 keyed to shafts 57 and 54, respectively. By means of clutch 60, gear 56 may be keyed to intermediate shaft 57 whenever desired. Reversing clutch 55 is actuated from the longitudinally extending rock shaft 61 by means of the crank arm 62 projecting downwardly from the rear end of rock shaft 61 and having a forked lower end 63 engaging with the clutch member 55. Power clutch 60 is actuated from the tubular rock shaft 64, which surrounds rock shaft 61, by means of downwardly extending crank arm 65 secured to the rear end of tubular shaft 64, and an intermediate link 66 and lever 67. Lever 67 is connected at one end with the clutch member 60, is intermediately pivoted at 68 on a bracket 69 projecting from beam 2, and its other end is connected through link 66 with the lower end of crank arm 65. Rock shafts 61 and 64 are controlled from the front of the machine, where the operator will be positioned, by means of the conveniently located hand levers 70 and 71, respectively. When it is desired to shift the steering wheels in either direction, the operator manipulates lever 70 to determine the direction of travel of nut 41, and then manipulates lever 71 to throw on the power. This shifting of the steering wheels may be accomplished either while the traction wheels are being driven to move the carriage, or while the carriage is otherwise at rest. This will be determined by whether or not power clutch 17 is in operative or inoperative position. Of course, while the winch is being driven to operate the lifting mechanism for the bucket, both clutches 17 and 60 will be out of engagement with the respective gears 10 and 56, and the traction and steering mechanisms will be at rest.

In order to distribute the side thrusts of screw shaft 38 between the several frame beams 1, 2, 3 and 4, we have devised the improved cross-brace construction now to be described. A spreader sleeve 72 keyed to the shaft 38 as at 73 bears at its ends, through thrust washers 74 against the adjacent bearings 40 to impact the thrusts to one or the other of these bearings according to the direction in which the steering mechanism is being driven. Between the several means 1, 2, 3 and 4 are positioned a series of properly shaped plates 75 and 76 having angle flanges 77 riveted or bolted thereto and to the respective frame beams. One or more tie-bolts 78 are secured through the several beams 1, 2, 3 and 4, and through the angle flanges 77 of the several intermediate brace plates 75 and 76, which are positioned end to end between the several means. This bolt 78 (if only one is used) is preferably placed nearer the lower edges of the frame means, where the spreading force of the screw shaft 38 is concentrated. If desired, one or more additional tie-bolts 79 may be secured through the frame beams at a position spaced laterally from bolt 78, and at the other side of the plates 75 and 76, to resist forces tending to buckle the means. In this way, the thrust of shaft 38, when transmitted to one of the bearings 40, will be distributed evenly between the several frame beams 1, 2, 3 and 4.

Preferably the shaft 54 will be divided at some intermediate point, and the sections connected by a coupling sleeve 80, permanently secured to one shaft section, and connected with the other section by means of a frangible pin 81 which will break under undue stress to avoid injury to other portions of the steering mechanism.

Although certain preferred forms of the several features of this invention have been disclosed in the preceding specification, and accompanying drawings, it is obvious that many changes in proportions and design might be adopted, and equivalents might be used, without departing from the scope of the invention, as set forth in the following claims.

We claim:

1. In traction equipment for heavy mobile machinery, the combination with a carriage including a supporting frame, a pair of driving wheels at one end thereof and a pair of steering wheels at the other end thereof, a power plant supported on the carriage, and driving mechanism for the first mentioned wheels operated from the power plant, of steering mechanism for the steering wheels, and means power-driven from the carriage driving mechanism for operating the steering mechanism comprising a power-clutch, and reversing gearing including a reversing clutch, and manually operable clutch-controlling mechanism operable from within the carriage including a pair of nested rock-shafts, a controlling lever at one end of each shaft, the two levers extending into the carriage at adjacent positions, and lever connections from the opposite ends of each shaft to the respective clutches.

2. In traction equipment for heavy mobile machinery, the combination with a carriage including a supporting frame, a pair of driving wheels at one end thereof and a pair of steering wheels at the other end thereof, a power plant supported on the carriage, and driving mechanism for the first mentioned wheels operated from the power plant, said mechanism including a driving clutch, of steering mechanism for the steering wheels comprising a transverse screw-shaft mounted in the carriage frame, a nut on the shaft, connections between the nut and the steering wheels, a driving shaft extending longitudinally of the frame, reversing gearing including a clutch between the driving shaft and the screw-shaft, driving connections between the driving shaft and the carriage driving mechanism including a clutch, and means operable from a point within the carriage for selectively controlling both clutches of the steering mechanism, including a pair of nested rock-shafts, with controlling levers at one end thereof for the respective clutches.

3. In traction equipment for heavy mobile machinery, the combination with a carriage formed of a plurality of spaced metal beams, a pair of driving wheels at one end thereof and a pair of steering wheels at the other end thereof, of steering mechanism comprising a screw-shaft mounted transversely beneath the carriage frame, a plurality of bearings for the shaft supported by the respective frame beams, a tubular thrust collar or spreader surrounding the shaft between two of these bearings, reversible driving gear connections mounted on the shaft between a second pair of bearings, a nut mounted on the threaded portion of the shaft between another pair of bearings, and connections between the nut and the steering wheels.

4. In traction equipment for heavy mobile machinery, the combination with a carriage formed of a plurality of spaced metal beams, a pair of driving wheels at one end thereof and a pair of steering wheels at the other end thereof, of steering mechanism comprising a screw-shaft mounted transversely beneath the carriage frame, a plurality of bearings for the shaft supported by the respective frame beams, a tubular thrust collar or spreader surrounding the shaft between two of these bearings, reversible driving gear connections mounted on the shaft between a second pair of bearings, a nut mounted on the threaded portion of the shaft between another pair of bearings, and connections between the nut and the steering wheels, and a transversely arranged series of flanged thrust plates positioned in line between the several frame beams adjacent the screw shaft and tie-bolts secured transversely through the several beams and plate flanges.

5. In traction equipment for heavy mobile machinery, a carriage formed of a plurality of spaced metallic beams, a transverse thrust resisting wall consisting of a series of flanged plates positioned end to end transversely between the several beams, a plurality of aligned bearings suspended from the several beams beneath the transverse wall, a screw shaft mounted in the bearings, a thrust collar secured on the shaft between two of the bearings, and a tie-bolt secured transversely through the several beams near the lower edges thereof, and adjacent the flanged plates and the bearings.

RALPH I. ALEXANDER.
ALFRED H. EXTON.